E. P. TERRELL.
Animal-Trap.
No. 210,578.  Patented Dec. 3, 1878.
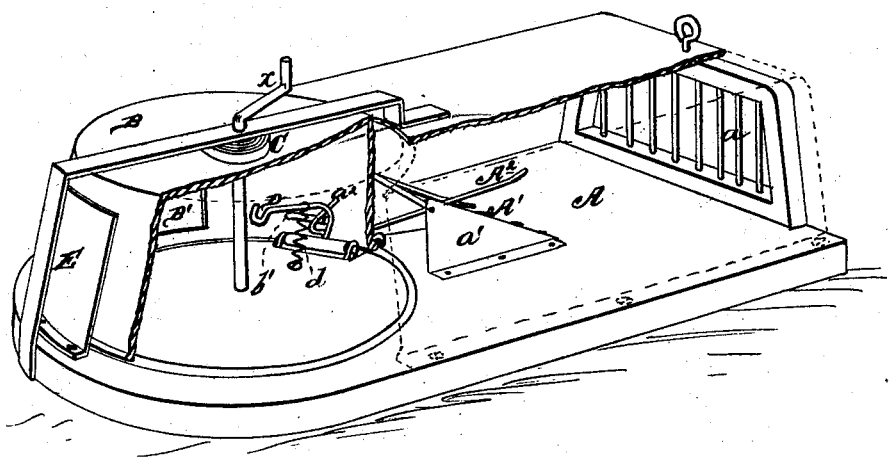
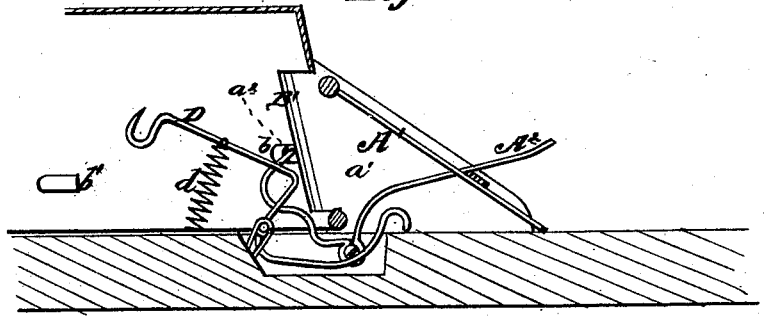

UNITED STATES PATENT OFFICE.

ENOCH P. TERRELL, OF BELLEFONTAINE, OHIO.

IMPROVEMENT IN ANIMAL-TRAPS.

Specification forming part of Letters Patent No. 210,578, dated December 3, 1878; application filed November 2, 1878.

*To all whom it may concern:*

Be it known that I, ENOCH P. TERRELL, of Bellefontaine, in the county of Logan and State of Ohio, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my animal-trap, being a perspective view, partly in section. Fig. 2 is a detail view of trip mechanisms employed.

My invention relates to a trap for catching game or vermin, having a prison-chamber and an entrapping device combined in such a manner as to operate automatically.

The novelty consists in the construction, arrangement, and adaptation of parts, as will be more fully hereinafter set forth, and pointed out in the claims.

In carrying out my invention, I employ a prison-chamber having at one end a gravitating inclined gate, which governs a lever to release a revolving turret having an opening on opposite sides, and impelled in one direction by a spring.

Suitable catches upon the inner surface of the turret act in conjunction with two levers to set and release the trap.

After the animal has entered the trap and has been confined, he has only one exit, which is to the prison, and this action sets the trap for another animal.

Referring to the drawings, A represents the prison-chamber, having at one end a hinged gate, $a$, and being inclosed at the other end by a revolving turret, B, which is impelled in one direction by a spring, C.

$A^1$ represents a gravitating-gate, pivoted in standards $a^1$, and hanging in an inclined position in the prison, so as to allow ingress, but no egress, in that direction.

A lever, $A^2$, is operated upon by the gate, and serves to release the end $a^2$ from the catch $b$ at one side of the apertures $B'$ on the turret B.

$b'$ represents catches upon the inner surface of the turret B, which catches engage with a pivoted bait-lever, D, which is held in contact with the said catches by the constant force of a spiral spring, $d$.

The catches $b$ $b'$ are inclined in one direction and sharply defined in the other, allowing the turret to be reversed by means of crank $x$ to wind up the spring, when the point $a^2$ and bait-lever D ride idly over the catches $b$ $b'$, as is shown.

E represents a shield, which closes the opening B when the animal is entrapped before it enters the prison.

The operation of my device is obvious. The animal enters the trap, and, nibbling at the bait on the lever D, releases the same from the catch $b'$, when, impelled by the spring C, the turret B quickly revolves until the catch $b$ engages with the point $a^2$ of the prison-lever $A^2$. The animal is then confined in the turret, and has but one exit, which is to the prison-chamber A through the gate $A^1$. In entering the chamber, the gate $A^1$ operates the lever $A^2$, and releases the point $a^2$ from the catch $b$, when the turret again revolves until the catch $b'$ engages the bait-lever D, when the trap is again set and the animal imprisoned.

I am aware that a grating on a platform has been used in connection with a revolving door, and also that a revolving disk having a series of sections and platforms supported by studs and springs within a cage has been used. I make no claim to such constructions.

What I claim as new, and desire to secure by Letters Patent, is—

1. The revolving turret B, having apertures $B'$ and catches $b$ $b'$, in combination with spring C, shield E, lever D, spring $d$, and prison-chamber, as set forth.

2. The combination of the turret B $B'$ $b$ $b'$, bait-lever D $d$, shield E, and spring C with the prison-chamber A $a$, gate $A^1$, and lever $A^2$ $a^2$, as and for the purpose specified.

In testimony that I claim the above I have hereunto subscribed my name in the presence of two witnesses.

ENOCH P. TERRELL.

Witnesses:
E. J. HOWENSTINE,
JOSEPH H. LAWRENCE.